US012753818B2

(12) United States Patent
Iida

(10) Patent No.: US 12,753,818 B2
(45) Date of Patent: Oct. 6, 2026

(54) SPIRAL SPRING DEVICE

(71) Applicant: HAYAMIZU HATSUJO CO., LTD., Toyama (JP)

(72) Inventor: Kazumasa Iida, Toyama (JP)

(73) Assignee: HAYAMIZU HATSUJO CO., LTD., Toyama (JP)

( * ) Notice: Subject to any disclaimer, the term of this patent is extended or adjusted under 35 U.S.C. 154(b) by 445 days.

(21) Appl. No.: 18/547,033

(22) PCT Filed: Feb. 16, 2022

(86) PCT No.: PCT/JP2022/006191

§ 371 (c)(1),
(2) Date: Aug. 18, 2023

(87) PCT Pub. No.: WO2022/176913

PCT Pub. Date: Aug. 25, 2022

(65) Prior Publication Data

US 2024/0133441 A1 Apr. 25, 2024
US 2024/0229885 A9 Jul. 11, 2024

(30) Foreign Application Priority Data

Feb. 19, 2021 (JP) ................................ 2021-024843

(51) Int. Cl.
*F16F 1/10* (2006.01)

(52) U.S. Cl.
CPC .................................... *F16F 1/10* (2013.01)

(58) Field of Classification Search
CPC .................................... F16F 1/10; F16F 1/12
See application file for complete search history.

(56) References Cited

U.S. PATENT DOCUMENTS 9,296,314 B2 3/2016 Yamada
2017/0040869 A1* 2/2017 Wang ........................ H02P 6/20

FOREIGN PATENT DOCUMENTS

| | | | |
|---|---|---|---|
| DE | 102006051576 | A1 | 5/2008 |
| JP | H08-2829 | A | 1/1996 |
| JP | 2003-148533 | A | 5/2003 |
| JP | 2012-127388 | A | 7/2012 |
| JP | 2020-2967 | A | 1/2020 |
| WO | 2011154865 | A1 | 12/2011 |

OTHER PUBLICATIONS

Japanese Patent No. JP 2007092981 to Iida published on Apr. 12, 2007.*
European Patent No. EP 2690506 to Stranczl et al published on Jan. 29, 2014.*
International Search Report and Written Opinion received for PCT/JP2022/006191, mailed May 10, 2022.

* cited by examiner

*Primary Examiner* — Pamela Rodriguez
(74) *Attorney, Agent, or Firm* — Greer, Burns & Crain, Ltd

(57) ABSTRACT

Provided is a spiral spring device that increases the rotational range of the rotary shaft of an apparatus, that secures the strength of the rotary shaft, and that makes the functional components to be more easily housed inside of the rotary shaft, in which an inner end of a spiral spring is coupled to a shaft, and an outer end of the spiral spring is coupled to a sub shaft that is different from the shaft of the apparatus. The inner end of the spiral spring is shaped to follow the outline of the shaft to be coupled to the shaft by tightening.

6 Claims, 5 Drawing Sheets

PRIOR ART

SPIRAL SPRING DEVICE

BACKGROUND

The present invention relates to a spiral spring device to be incorporated into a variety of apparatuses including an apparatus whose lid opens and closes with respect to a hinge shaft of a body, and an apparatus that shows a measured value by the rotation of a pointer.

FIGS. 9 and 10 show a conventional spiral spring 100 described in Patent Documents 1 and 2. The conventional spiral spring 100 has an inner end 110 and an outer end 120, between which a plate material 130 is spirally wound at a constant pitch to form a non-contact structure. The spiral device 100 is attached to an apparatus in such a way that the inner end 110 of the spiral spring 100 is coupled to an inner shaft 140 of the apparatus, and the outer end 120 of the spiral spring 100 is coupled to an outer shaft 150 of the apparatus.

Referring to the example in FIG. 9, the rotary shaft 140 of the apparatus has a solid structure, and is provided with a slit 160. The inner end 110 of the spiral spring 100 is inserted into the slit 160 so that the inner end 110 is locked to the rotary shaft 140 to be coupled to the rotary shaft 140. The outer end 120 is wound around the fixed shaft 150 of the apparatus so that the outer end 120 is locked to the fixed shaft 150 to be coupled to the fixed shaft 150.

Referring to the example in FIG. 10, the rotary shaft 140 of the apparatus has a solid structure, and is formed in a cross shape. The inner end 110 of the spiral spring 100 abuts on the rotary shaft 140 to be welded, whereby the inner end 110 is coupled to the rotary shaft 140. As with the example in FIG. 9, the outer end 120 is wound around the fixed shaft 150 of the apparatus to be coupled to the fixed shaft 150.

In such a spiral spring 100, if the rotary shaft 140 rotates in the forward direction (clockwise in the illustrated example), the spiral spring 100 is wound around, and torque is accumulated. If the rotational force on the rotary shaft 140 is released, the torque accumulated by the spiral spring 100 causes the rotary shaft 140 to rotate in the reverse direction, so that the rotary shaft 140 automatically returns to its original position.

PRIOR-ART DOCUMENTS

Patent Documents

Patent Document 1: Japanese Unexamined Patent Application Publication No. H08-2829

Patent Document 2: Japanese Unexamined Patent Application Publication No. 2020-2%7

SUMMARY

In the conventional configuration of the spiral spring 100, the inner end 110 of the spiral spring 100 is coupled to the rotary shaft 140 by inserting the inner end 110 into a slit of the rotary shaft 140, or by welding the inner end 110 to the rotary shaft 140. Accordingly, the spring force of the spiral spring 100 is always acting on the rotary shaft 140. Because the rotational range of the rotary shaft 140 is restricted by the spiral spring 100, this configuration has a problem in that the rotational range of the rotary shaft 140 of the conventional spiral spring 100 cannot be increased. Also, if the rotary shaft 140 is downsized and the area of the inner end 110 to be used for coupling is reduced, it becomes difficult for the spiral spring 100 to secure sufficient strength at the connection part. This is because if the rotary shaft 140 is downsized, the slit used for coupling, or the area used for welding becomes smaller. Furthermore, if the rotary shaft 140 is downsized, it becomes difficult for the spiral spring 100 to house functional components into the inside of the rotary shaft 140.

The present invention has been made to address these conventional problems. The objective of the present invention is to provide a spiral spring device that increases the rotational range of the rotary shaft of an apparatus, that secures the strength of the rotary shaft, and that makes the functional components to be more easily housed inside of the rotary shaft.

A spiral spring device of the present invention has an inner end of a spiral spring coupled to a shaft of an apparatus, and an outer end of the spiral spring coupled to a member different from the shaft of the apparatus, wherein the inner end of the spiral spring is formed into a shape that follows the outline of the shaft to be coupled to the shaft by tightening.

In the present invention, the shaft of the apparatus has a hollow structure. Also, the shaft of the apparatus is formed in a noncircular outer configuration, and the inner end of the spiral spring is formed to follow the outline of the noncircular shape of the shaft. Additionally, the shaft of the apparatus is formed in a circular outline, and the inner end of the spiral spring is tightened into the shaft with multiple windings. Moreover, a plate material is wound around such that the layers of the plate material are in non-contact with each other. Furthermore, the spiral spring has a portion in which the plate material is tightly wound around.

The present invention provides advantageous effects such that the rotational range of a rotary shaft of an apparatus is increased, the strength of the rotary shaft is secured, and the housing of functional components on the inside of the rotary shaft is made easy.

DETAILED DESCRIPTION

Figure 1:
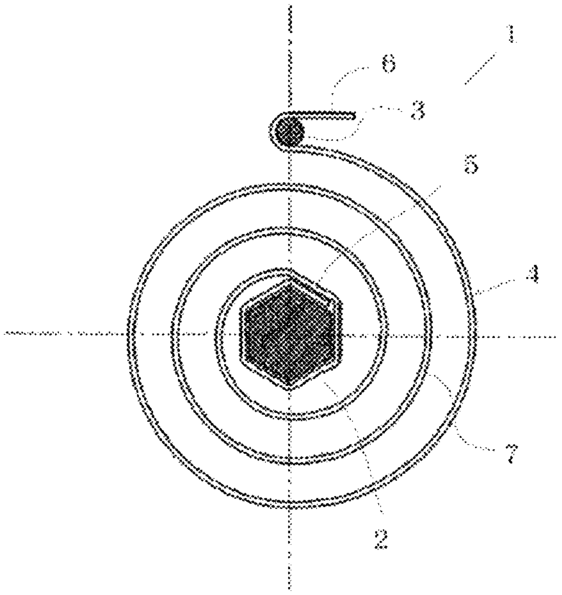
FIG. 1 is a front view that shows a structure of a spiral spring device according to the First Embodiment of the present invention.

Hereinafter, embodiments of the present invention will be described with reference to the accompanying drawings, in which like reference numerals are used throughout the figures to reference like features and components.

First Embodiment

Figure 2:
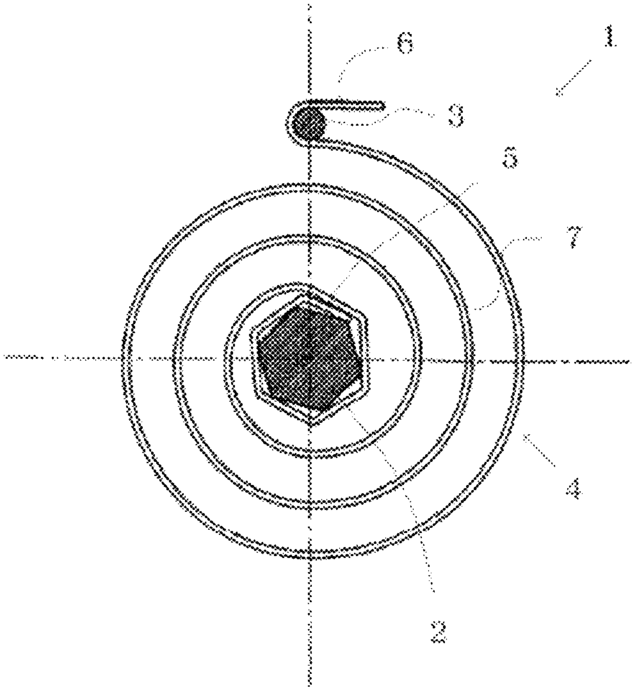
FIG. 2 is a front view that shows the state in which the shaft has rotated in the reverse direction from the state in FIG. 1.

FIGS. 1 and 2 show a spiral spring device 1 of the First Embodiment of the present invention. The spiral spring device 1 includes an apparatus that is provided with a shaft 2, and a sub shaft 3, which is a member different from the shaft 2. The shaft 2 and sub shaft 3 are linked by a spiral spring 4, whereby the spiral spring device 1 is incorporated into the apparatus.

The spiral spring 4 is formed of a plate material 7, which is wound spirally, and has an inner end 5 and an outer end 6, which constitute both ends of the plate material 7. The plate material 7 is wound spirally at a constant pitch to make the layers of the plate material 7 to be in non-contact with each other. The outer end 6 of the spiral spring 4 is wound tightly around the sub shaft 3 of the apparatus. The outer end 6 is coupled to the outer surface of the sub shaft 3 by having the outer end 6 locked to a slit of the outer surface of the sub shaft 3 or by having the outer end 6 welded to the outer surface of the sub shaft 3.

The inner end 5 of the spiral spring 4 is coupled to the shaft 2 of the apparatus by tightening. In this embodiment, the shaft 2 has a solid structure, and is formed in a noncircular shape, i.e., in a hexagonal shape. The inner end 5 of the spiral spring 4 is bent into a shape that follows the outline of the shaft 2 to match the noncircular outer configuration of the shaft 2. The inner end 5 of the spiral spring 4 is coupled to the shaft 2 by tightening the inner end 5 to the outer surface of the shaft 2. Accordingly, the coupling of the inner end 5 to the shaft 2 is not made by inserting the end into the slit of the shaft 2 or by welding the inner end 5 to the shaft 2, but is made by tightening the inner end 5 to the outer surface of the shaft 2.

The coupling made by this kind of tightening allows the shaft 2 to rotate with respect to the inner end 2. The tightening allows the inner end 5 to be coupled to the shaft 2, by which the spring force of the spiral spring 4 can be transmitted to the apparatus, or the power of the apparatus can be transmitted to the spiral spring 4. The shaft 2 may have an outer shape including tetragonal, polygonal other than tetragonal, partially notched circular, and other noncircular configurations. In such a case, the inner end 5 is shaped to follow the outline of the shaft 2.

Referring to FIG. 1, the inner end 5 is coupled to the shaft 2 by tightening, where the shaft 2 is in a stationary state. If the shaft 2 rotates in the forward direction (clockwise rotation in the illustrated example) in this state, the rotational force is transmitted to the inner end 5 and the spiral spring 4 is wound tighter, so that the shaft 2 and layers of the spiral spring 4 come into close contact with each other. The close contact increases the frictional force, and strengthens the winding of the spiral spring 4 to the shaft 2. At this time, the spiral spring 4 is wound tight to accumulate torque.

FIG. 2 shows the state in which the shaft 2 rotates in the reverse direction (counterclockwise rotation in the illustrated example) from the state in FIG. 1. Because the frictional force acts between the spiral spring 4 and the shaft 2 in a certain area where the initial rotation of the shaft 2 is made in the reverse direction, the inner end 5 follows the reverse rotation, and the spiral spring 4 is unwound by the reverse rotation of the shaft 2. If the shaft 2 rotates in the reverse direction more than the distance of a certain area and the torque accumulated by the spiral spring 4 is released, the inner end 5 no longer follows the shaft 2 and the shaft 2 runs idle. Therefore, the spiral spring device 1 is provided with a backstop function (one-way clutch function).

Because the spring force of the spiral spring 4 does not act on the shaft 2 when the shaft 2 rotates in the reverse direction, the shaft 2 is not restricted by the spiral spring 4 to rotate freely, which increases the rotational range of the shaft 2. Furthermore, because the inner end 5 is coupled to the outer surface of the shaft 2 by tightening, the coupling area between the inner end 5 and the shaft 2 can be increased, so that the connection part can secure sufficient strength.

Figure 3:
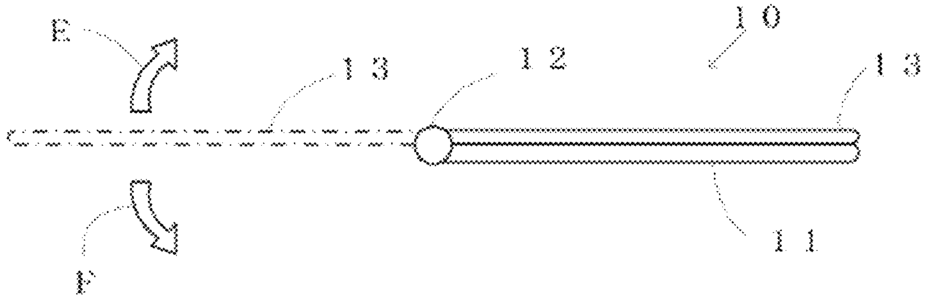
FIG. 3 is a front view in which the opening and closing structure according to the First Embodiment is applied to an apparatus.
Figure 4:
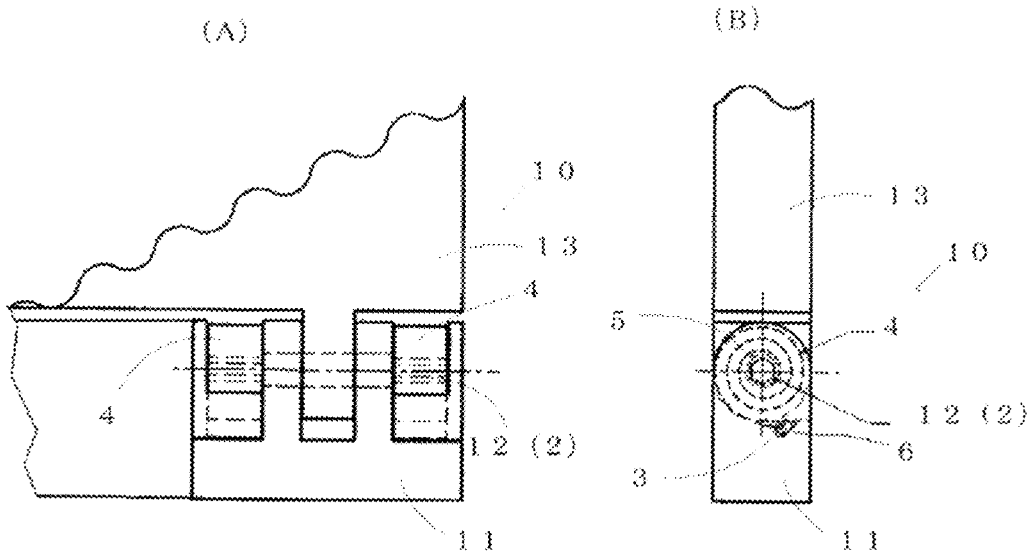
FIG. 4 is a side view that shows the operation of the opening and closing structure according to the First Embodiment.

FIGS. 3 and 4 show an example in which the spiral spring device 1 of this Embodiment is applied to an apparatus 10 having a foldable structure. Examples of the apparatus 10 having a foldable structure include convertible laptops, foldable smartphones, foldable cell phones, foldable electronic dictionaries, foldable organizers, and convertible roofs of passenger cars. The apparatus 10 has a flat-shaped apparatus body 11 and a lid 13, which is attached to the apparatus body 11 such that the lid 13 takes an open position and a closed position with respect to the apparatus 10. The lid 13 closes the apparatus 10 by a closing motion. The lid 13 is fitted to a hinge shaft 12 that is rotatably provided to the end of the apparatus body 11. The lid 13 is rotated by the hinge shaft 12 that rotates in the forward and reverse directions, and by this rotation, the lid 13 operates to take an open position or a closed position with respect to the apparatus body 11. In FIG. 3, the chain line shows the open position, and the solid line shows the closed position. In FIG. 4, the hinge shaft 12 of the apparatus body 11 serves as the shaft 2 to which the spiral spring 4 is coupled, in which the inner end 5 of the spiral spring 4 is coupled to the outer surface of the hinge shaft 12 by tightening. The outer end 6 of the spiral spring 4 is coupled to the sub shaft 3 provided to the apparatus body 11. The outer end 6 is coupled to the sub shaft 3 by being locked to or being welded to the sub shaft 3. In this case, the sub shaft 3 is a fixed shaft that does not rotate.

Hereafter, the operation of the apparatus 10 will be described. Referring to FIG. 3, as the lid 13 in the open state shown by a chain line is rotated in the direction of arrow E, the hinge shaft 12 rotates in the forward direction, so that the spiral spring 4, whose inner end 5 is coupled to the hinge shaft 12 by tightening, is wound to store torque (spring force) to become the state of the apparatus 10 shown by a solid line in FIG. 3. In this state shown by the solid line, because a spring force in the open direction acts on the lid 13, the lid 13 is locked by a locking member (not shown) to keep the closed position.

If the locking member is unlocked, the hinge shaft 12 rotates in the reverse direction due to the spring force of the spiral spring 4, the lid 13 turns in the open direction, and the lid 13 rotates to the position shown by the chain line in FIG. 3, where the lid 13 takes the open position. In this open position of the lid 13, the torque of the spiral spring 4 has been released. Also, in this Embodiment, the inner end 5 of the spiral spring 4 is coupled to the hinge shaft 12 by tightening, so that the hinge shaft 12 is capable of running idle with respect to the inner end 5. This allows the lid 13 to rotate further in the direction of arrow F. This is because the spring force of the spiral spring 4 does not act on the hinge shaft 12, so that the rotational range of the hinge shaft 12 is increased.

Second Embodiment

Figure 5:
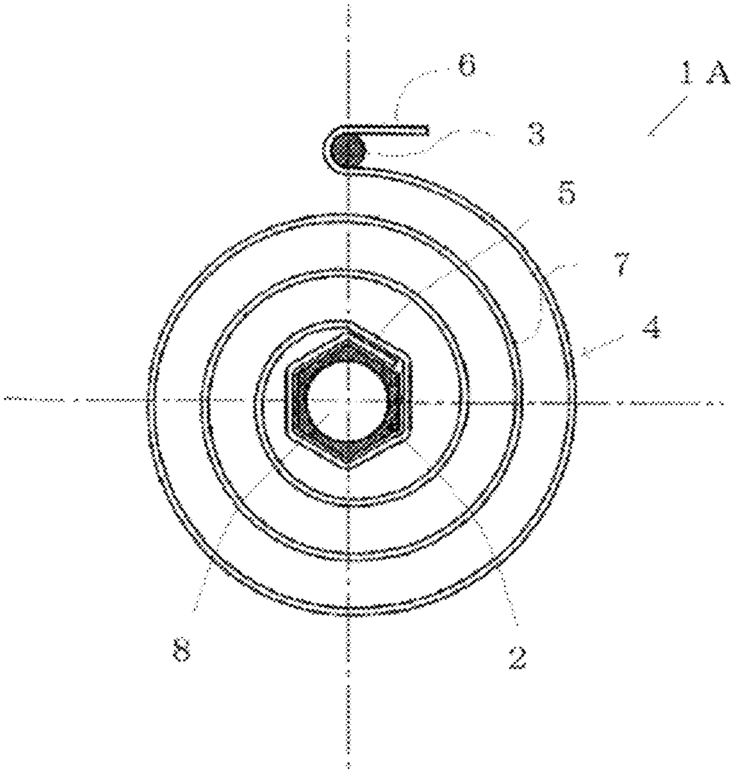
FIG. 5 is a front view that shows a structure of a spiral spring device according to the Second Embodiment of the present invention.

FIG. 5 shows a spiral spring device 1A of the Second Embodiment of the present invention. In this Embodiment also, a spiral spring 4 includes a plate material 7, which is wound spirally, and an inner end 5 and an outer end 6, which constitute both ends of the plate material 7. The outer end 6 of the spiral spring 4 is wound tightly around a sub shaft 3 of an apparatus to be locked to the sub shaft 3, such that the outer end 6 is coupled to the sub shaft 3. The inner end 5 of the spiral spring 4 is coupled to a shaft 2 of the apparatus by tightening. The outer shape of the shaft 2 is formed into a hexagonal shape, which is noncircular, and the inner end 5 of the spiral spring 4 is formed to follow the outline of this noncircular shape, so that the inner end 5 is coupled to the outer surface of the shaft 2 by tightening.

Therefore, as with the Embodiment shown in FIGS. 1 and 2, the inner end 5 of the spiral spring 4 no longer follows the shaft 2 if the shaft 2 rotates in the reverse direction more than the distance of a certain area and the torque accumulated by the spiral spring 4 is released, so that the shaft 2 runs idle. Thus, the spiral spring device 1 is provided with a backstop function (one-way clutch function). Also, because the spring force of the spiral spring 4 does not act on the shaft 2 when the shaft 2 rotates in the reverse direction (counterclockwise) with respect to the direction to which the spiral spring 4 is wound, the rotational range of the shaft 2 can be increased. In addition, because the inner end 5 is coupled to the outer surface of the shaft 2 by tightening, the coupling area between the inner end 5 and the shaft 2 can be increased, so that the connection part can secure sufficient strength.

In this Embodiment, the shaft 2 of the apparatus, which has a hexagonal shape, has a hollow structure. The reference numeral 8 indicates a hollow portion formed in the shaft 2. The hollow portion 8 of the shaft 2 is capable of housing functional components of the apparatus. This provides the shaft 2 with multiple functions in addition to its rotational function for torque transmission.

Third Embodiment

Figure 6:
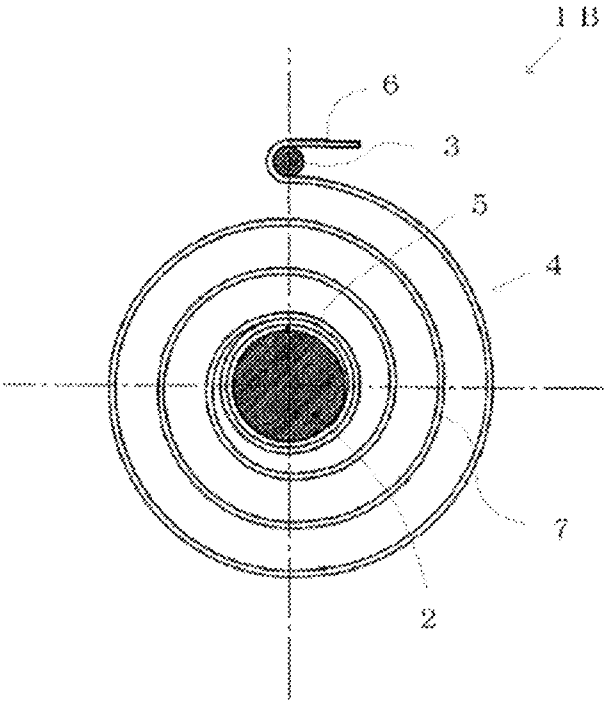
FIG. 6 is a front view that shows a structure of a spiral spring device according to the Third Embodiment of the present invention.

FIG. 6 shows a spiral spring device 1B of the Third Embodiment of the present invention. In this Embodiment, a shaft 2 of the apparatus has a solid structure, and has a circular outline. An inner end 5 of a spiral spring 4 is circularly formed, which is wound with a diameter larger than the outer diameter of the shaft 2, such that the inner end 5 is coupled to the shaft 2 by tightening with multiple winding. An outer end 6 of the spiral spring 4 is coupled to a sub shaft 3 to have the outer end 6 to be locked to a slit of the outer surface of the sub shaft 3 or to have the outer end 6 to be welded to the outer surface of the sub shaft 3.

Also in this structure, the inner end 5 of the spiral spring 4 no longer follows the shaft 2 if the shaft 2 rotates in the reverse direction more than the distance of a certain area and the torque accumulated by the spiral spring 4 is released, so that the shaft 2 runs idle. Thus, the spiral spring device 1 is provided with a backstop function (one-way clutch function). Further, because the spring force of the spiral spring 4 does not act on the shaft 2 when the shaft 2 rotates in the reverse direction with respect to the direction to which the spiral spring 4 is wound, the rotational range of the shaft 2 can be increased. In addition, because the inner end 5 is coupled to the outer surface of the shaft 2 by tightening, the coupling area between the inner end 5 and the shaft 2 can be increased, so that the connection part can secure sufficient strength. In this Embodiment, the shaft 2 is configured to have a solid structure, but the shaft 2 may be configured to have a hollow structure to contain a hollow portion. This allows the shaft 2 to house functional components inside thereof, which provides the shaft 2 with multiple functions.

Fourth Embodiment

Figure 7:
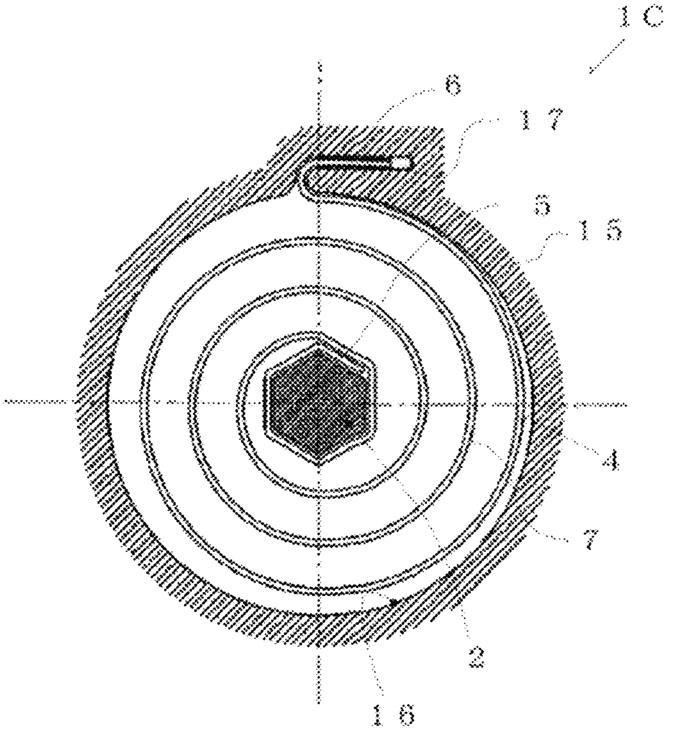
FIG. 7 is a front view that shows a spiral spring device according to the Fourth Embodiment of the present invention.

FIG. 7 shows a spiral spring device 1C of the Fourth Embodiment of the present invention. The reference numeral 15 refers to a case formed on an apparatus. The case 15 has an accommodation part 16, in which a spiral spring 4 is housed. The accommodation part 16 houses in its central region a shaft 2 that has a solid structure and that is formed in a hexagonal shape. An inner end 5 of the spiral spring 4 is coupled to the outer surface of the shaft 2 by tightening. The inner end 5 of the spiral spring 4 is shaped in accordance with the outline of the shaft 2, which is formed in a hexagonal shape, and is coupled to the outer surface of the shaft 2 by tightening. The accommodation part 16 of the case 15 is provided with a slit 17 at the outer part thereof, into which an outer end 6 of the spiral spring 4 is inserted so that the outer end 6 is locked to the slit 17, whereby the outer end 6 is coupled to the case 15.

In this Embodiment, the entire case 15 is rotatable. Because the spiral spring 4 is coupled to the slit 17 by the outer end 6, as the case 15 rotates counterclockwise, the spiral spring 4 is wound to accumulate torque. If the case 15 rotates in the reverse direction (clockwise direction), the tightening of the inner end 5 to the shaft 2 weakens, and the spiral spring 4 runs idle with respect to the shaft 2. Thus, this Embodiment is provided with a one-way clutch function.

Fifth Embodiment

Figure 8:
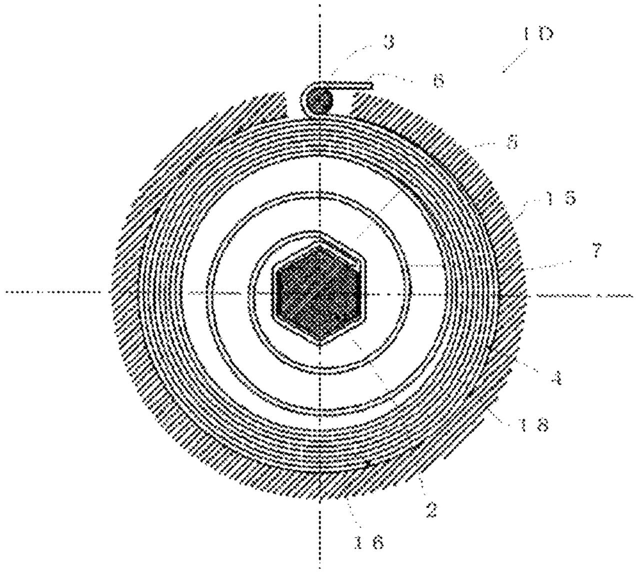
FIG. 8 is a front view that shows a structure of a spiral spring device according to the Fifth Embodiment of the present invention.
Figure 9:
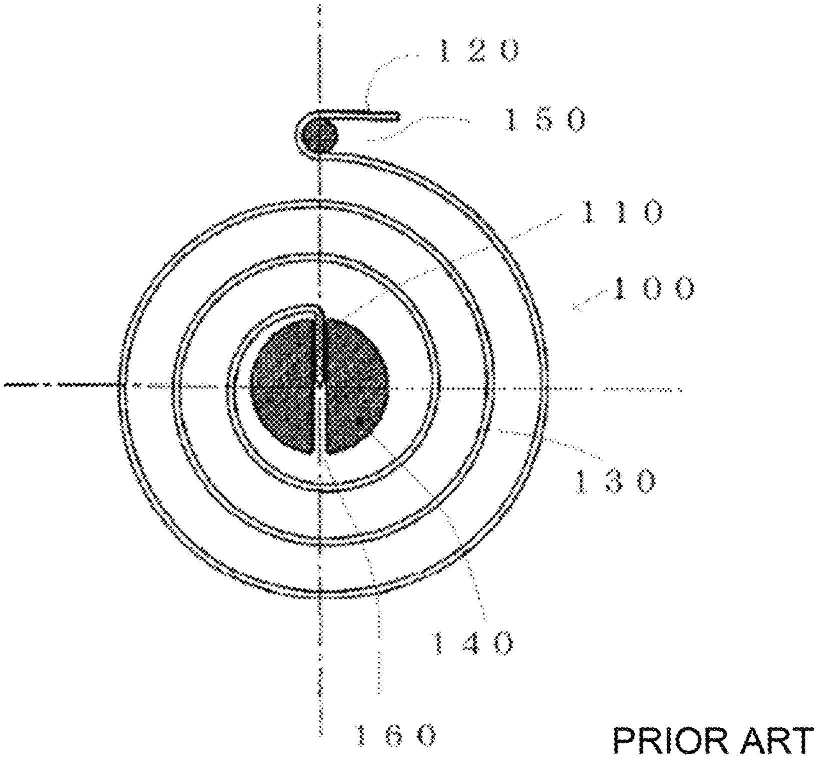
FIG. 9 is a front view of a conventional spiral spring device.
Figure 10:
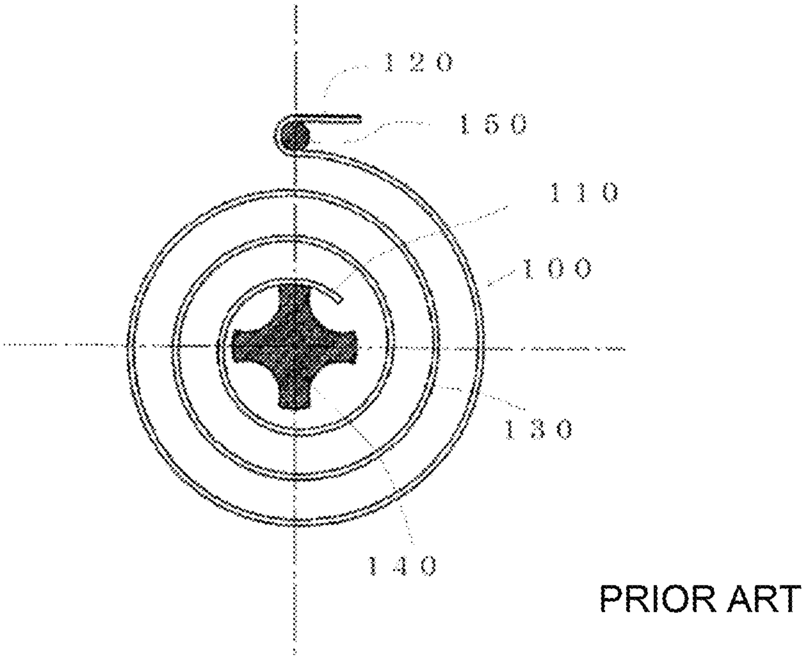
PRIOR ART Figure 10
FIG. 10 is a front view of another conventional spiral spring device.

FIG. 8 shows a spiral spring device 1D of the Fifth Embodiment of the present invention, which is a modified embodiment of the Fourth Embodiment. As with the Embodiment shown in FIG. 7, in this spiral spring device 1D, a spiral spring 4 is housed in an accommodation part 16 of a case 15. A plate material 7, which forms the spiral spring 4, is wound spirally, wherein on the outer circumference of the spiral spring 4, a tightly wound portion 18 is formed in which layers of the plate material 7 are tightly wound to each other. Even the spiral spring 4 having such a tightly wound portion 18 can operate in the same manner as the Embodiment shown in FIG. 7.

DESCRIPTION OF REFERENCE NUMERALS

1, 1A, 1B, 1C, 1D spiral spring device
2. shaft
3. sub shaft
4. spiral spring
5. inner end
6. outer end
7. plate material
8. hollow portion

10. apparatus
12. hinge shaft
20. case
16. accommodation part
17. slit
18. tightly wound portion

The invention claimed is:

1. A spiral spring device, comprising: an inner end of a spiral spring is coupled to a shaft of an apparatus, the shaft rotates in forward and reverse directions; and an outer end of the spiral spring is coupled to a member different from the shaft of the apparatus;

wherein the inner end of the spiral spring is formed into a shape that follows the outline of the shaft to be coupled to the shaft by tightening;

wherein when the shaft rotates in the forward direction, the inner end follows in the forward rotation and the spiral spring is wound tight to accumulate torque;

wherein when the shaft rotates in the reverse direction for a distance of a certain area, the inner end follows the reverse rotation, and the spiral spring is unwound by the reverse rotation of the shaft; and when the shaft rotates in the reverse direction more than the distance of a certain area, and the torque accumulated by the spiral spring is released and the shaft runs idle.

2. The spiral spring device of claim 1, wherein the shaft of the apparatus has a hollow structure.

3. The spiral spring device of claim 1, wherein the shaft of the apparatus is formed in a noncircular outer configuration, and the inner end of the spiral spring is formed to follow the outline of the noncircular shape of the shaft.

4. The spiral spring device of claim 1, wherein the shaft of the apparatus is formed in a circular outline, and the inner end of the spiral spring is tightened into the shaft with multiple windings.

5. The spiral spring device of claim 1, wherein a plate material is wound around such that layers of the plate material are in non-contact with each other.

6. The spiral spring device of claim 1, wherein the spiral spring has a portion in which the plate material is tightly wound around.

* * * * *